(12) United States Patent
Sun et al.

(10) Patent No.: US 10,713,457 B2
(45) Date of Patent: Jul. 14, 2020

(54) TWO-DIMENSIONAL CODE GENERATION AND PROCESSING

(71) Applicant: Alibaba Group Holding Limited, George Town (KY)

(72) Inventors: Xi Sun, Hangzhou (CN); Hongwei Luo, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 16 days.

(21) Appl. No.: 16/197,883

(22) Filed: Nov. 21, 2018

(65) Prior Publication Data

US 2019/0180067 A1 Jun. 13, 2019

(30) Foreign Application Priority Data

Nov. 22, 2017 (CN) .......................... 2017 1 1171809

(51) Int. Cl.
*G06K 7/14* (2006.01)
*G06K 19/06* (2006.01)

(52) U.S. Cl.
CPC ..... *G06K 7/1417* (2013.01); *G06K 19/06037* (2013.01)

(58) Field of Classification Search
CPC .................. G06K 7/1417; G06K 19/06037
USPC .................. 235/462.1, 462.07, 462.09, 375
See application file for complete search history.

(56) References Cited

U.S. PATENT DOCUMENTS

| 2008/0245869 | A1 | 10/2008 | Berkun et al. |
| 2008/0245968 | A1 | 10/2008 | Tredwell et al. |
| 2009/0115576 | A1* | 5/2009 | Schuessler .......... G06F 16/2237 340/10.1 |
| 2010/0315681 | A1* | 12/2010 | Misawa ............. H04N 1/32144 358/1.15 |
| 2012/0127532 | A1 | 5/2012 | Sugawara et al. |
| 2014/0367463 | A1 | 12/2014 | Cibor |
| 2015/0235118 | A1 | 8/2015 | Simske et al. |
| 2016/0072801 | A1* | 3/2016 | Cao .......................... H04L 9/00 713/186 |
| 2016/0119273 | A1 | 4/2016 | Wang et al. |
| 2016/0267370 | A1* | 9/2016 | Nishizaki ............. G06K 7/1417 |
| 2017/0053260 | A1* | 2/2017 | Zhou ...................... G06Q 20/00 |

(Continued)

FOREIGN PATENT DOCUMENTS

CN 102542235 7/2012
CN 103400173 11/2013

(Continued)

OTHER PUBLICATIONS

International Search Report and Written Opinion in International Application No. PCT/US2018/062193, dated Feb. 1, 2019, 10 pages.

(Continued)

*Primary Examiner* — Edwyn Labaze
(74) *Attorney, Agent, or Firm* — Fish & Richardson P.C.

(57) ABSTRACT

Techniques for generating and processing two-dimensional barcodes are described. One example method includes identifying original content to be encoded in a two-dimensional (2D) barcode structure; and generating a 2D barcode associated with the original content based on at least the 2D barcode structure and the original content, wherein the 2D barcode structure includes at least an identification field and a data field, and the identification field indicates one or more data elements in the data field.

15 Claims, 8 Drawing Sheets

(Generate and process a 2D code based on a new 2D code information structure)

(56) References Cited

U.S. PATENT DOCUMENTS

2017/0076191 A1    3/2017  Feng
2017/0103293 A1    4/2017  Pic
2017/0161717 A1*   6/2017  Xing .................. G06Q 20/3274
2018/0331833 A1*  11/2018  Tomlinson .......... H04L 63/0861

FOREIGN PATENT DOCUMENTS

| | | |
|---|---|---|
| CN | 104463296 | 3/2015 |
| CN | 104616046 | 5/2015 |
| CN | 105471575 | 4/2016 |
| CN | 103544074 | 6/2016 |
| TW | 201631524 | 9/2016 |

OTHER PUBLICATIONS

International Preliminary Report on Patentability (Chapter II) in International Application No. PCT/US2018/062193 dated Jan. 14, 2020; 13 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

* cited by examiner

TWO-DIMENSIONAL CODE GENERATION AND PROCESSING

CROSS-REFERENCE TO RELATED APPLICATIONS

This application claims priority to Chinese Patent Application No. 201711171809.0, filed on Nov. 22, 2017, which is hereby incorporated by reference in its entirety.

TECHNICAL FIELD

The present specification relates to the field of computer software technologies, and in particular, to a two-dimensional code generation method, a two-dimensional code processing method, an apparatus, a device, and a two-dimensional code.

BACKGROUND

As two-dimensional (2D) codes are more widely used in different application scenarios, more products and services integrate service information to 2D codes.

In the existing technology, each service supported by an application usually has its own independent 2D code information structure. As a result, different shortcuts to the services that correspond to different 2D codes need to be provided for a user to select, so that the 2D code corresponding to the selected service can be scanned to retrieve the service information. For example, an application can include a 2D code for a user to take the bus and a 2D code for making payment to a product.

Based on the existing technology, a better information organization solution of 2D codes applicable to various service scenarios is needed.

SUMMARY

Implementations of the present specification provide a 2D code generation method, a 2D code processing method, an apparatus, a device, and a 2D code, to resolve a technical problem that an information organization solution of 2D codes better applicable to various service scenarios is needed.

To resolve the previous technical problem, the implementations of the present specification are implemented as described below.

An implementation of the present specification provides a 2D code generation method, including: obtaining original content; and generating a 2D code corresponding to the original content based on a 2D code information structure and the original content, where the 2D code information structure includes at least an identification field and a data field, and the identification field is used to indicate one or more data elements in the data field that need to be used in a specified service scenario.

An implementation of the present specification provides a 2D code processing method, including: scanning and converting a 2D code, to obtain a character string represented by the 2D code; parsing the character string based on a 2D code information structure of the 2D code, to obtain one or more data elements that need to be used in a current service scenario; and executing a service in the current service scenario based on the obtained data element, where the 2D code information structure includes at least an identification field and a data field, and the identification field is used to indicate one or more data elements in the data field that need to be used in a specified service scenario.

An implementation of the present specification provides a 2D code. The 2D code is generated based on a 2D code information structure and original content. The 2D code information structure includes at least an identification field and a data field. The identification field is used to indicate one or more data elements in the data field that need to be used in a specified service scenario.

An implementation of the present specification provides a 2D code generation apparatus, including an acquisition module, configured to obtain original content; and a generation module, configured to generate a 2D code corresponding to the original content based on a 2D code information structure and the original content, where the 2D code information structure includes at least an identification field and a data field, and the identification field is used to indicate one or more data elements in the data field that need to be used in a specified service scenario.

An implementation of the present specification provides a 2D code processing apparatus, including a scanning and converting module, configured to scan and convert a 2D code, to obtain a character string represented by the 2D code; a parsing module, configured to parse the character string based on a 2D code information structure of the 2D code, to obtain one or more data elements that need to be used in a current service scenario; and a service execution module, configured to execute a service in the current service scenario based on the obtained data element, where the 2D code information structure includes at least an identification field and a data field, and the identification field is used to indicate one or more data elements in the data field that need to be used in a specified service scenario.

An implementation of the present specification provides a 2D code generation device, including at least one processor and a memory communicatively connected to the at least one processor, where the memory stores an instruction that can be executed by the at least one processor, and the instruction is executed by the at least one processor to enable the at least one processor to obtain original content, and generate a 2D code corresponding to the original content based on a 2D code information structure and the original content, where the 2D code information structure includes at least an identification field and a data field, and the identification field is used to indicate one or more data elements in the data field that need to be used in a specified service scenario.

An implementation of the present specification provides a 2D code processing device, including at least one processor; and a memory communicatively connected to the at least one processor, where the memory stores an instruction that can be executed by the at least one processor, and the instruction is executed by the at least one processor to enable the at least one processor to scan and convert a 2D code, to obtain a character string represented by the 2D code; parse the character string based on a 2D code information structure of the 2D code, to obtain one or more data elements that need to be used in a current service scenario; and execute a service in the current service scenario based on the obtained data element, where the 2D code information structure includes at least an identification field and a data field, and the identification field is used to indicate one or more data elements in the data field that need to be used in a specified service scenario.

The previous at least one technical solution used in the implementations of the present specification can achieve the following beneficial effects: Corresponding adjustment can be flexibly and conveniently performed on the identification field and the data field of the new 2D code information structure based on different service scenarios, to generate a 2D code applicable to one or more different service scenarios and execute a corresponding service based on the 2D code. The new 2D code information structure can compatibly support 2D code information of a plurality of service scenarios or upgrade of services. same code for multiple application scenarios can be implemented, and the need for application shortcut resources can be effectively lowered. In addition, a user's learning time to use the service can be reduced, thereby delivering better user experience. As such, the previous technical problem can be partially or completely resolved.

BRIEF DESCRIPTION OF DRAWINGS

To describe technical solutions in the implementations of the present specification, the following briefly describes the accompanying drawings for describing the implementations or the existing technology. Apparently, the accompanying drawings in the following descriptions merely show some implementations of the present specification, and a person of ordinary skill in the art can still derive other drawings from these accompanying drawings without creative efforts.

DESCRIPTION OF IMPLEMENTATIONS

The implementations of the present specification provide a 2D code generation method, a 2D code processing method, an apparatus, a device, and a 2D code.

To make a person skilled in the art better understand the technical solutions in the present specification, the following clearly and comprehensively describes the technical solutions in the implementations of the present specification with reference to the accompanying drawings in the implementations of the present specification. Apparently, the described implementations are merely some rather than all of the implementations of the present application. All other implementations obtained by a person of ordinary skill in the art based on the implementations of the present specification without creative efforts shall fall within the protection scope of the present application.

The solutions of the present specification are based on a new 2D code information structure. The 2D code information structure is highly flexible and extensible, and can compatibly support 2D code information of a plurality of service scenarios or upgrade iteration of services. Same code for multiple application scenarios can be implemented, and the need for application shortcut resources can be effectively lowered. In addition, use and cognition costs of a user can be reduced, thereby delivering better user experience. As such, update costs caused by service upgrade of a terminal device that performs scanning can be reduced for the terminal device. The 2D code information structure mentioned below means the new 2D code information structure provided in the present specification.

Figure 1:
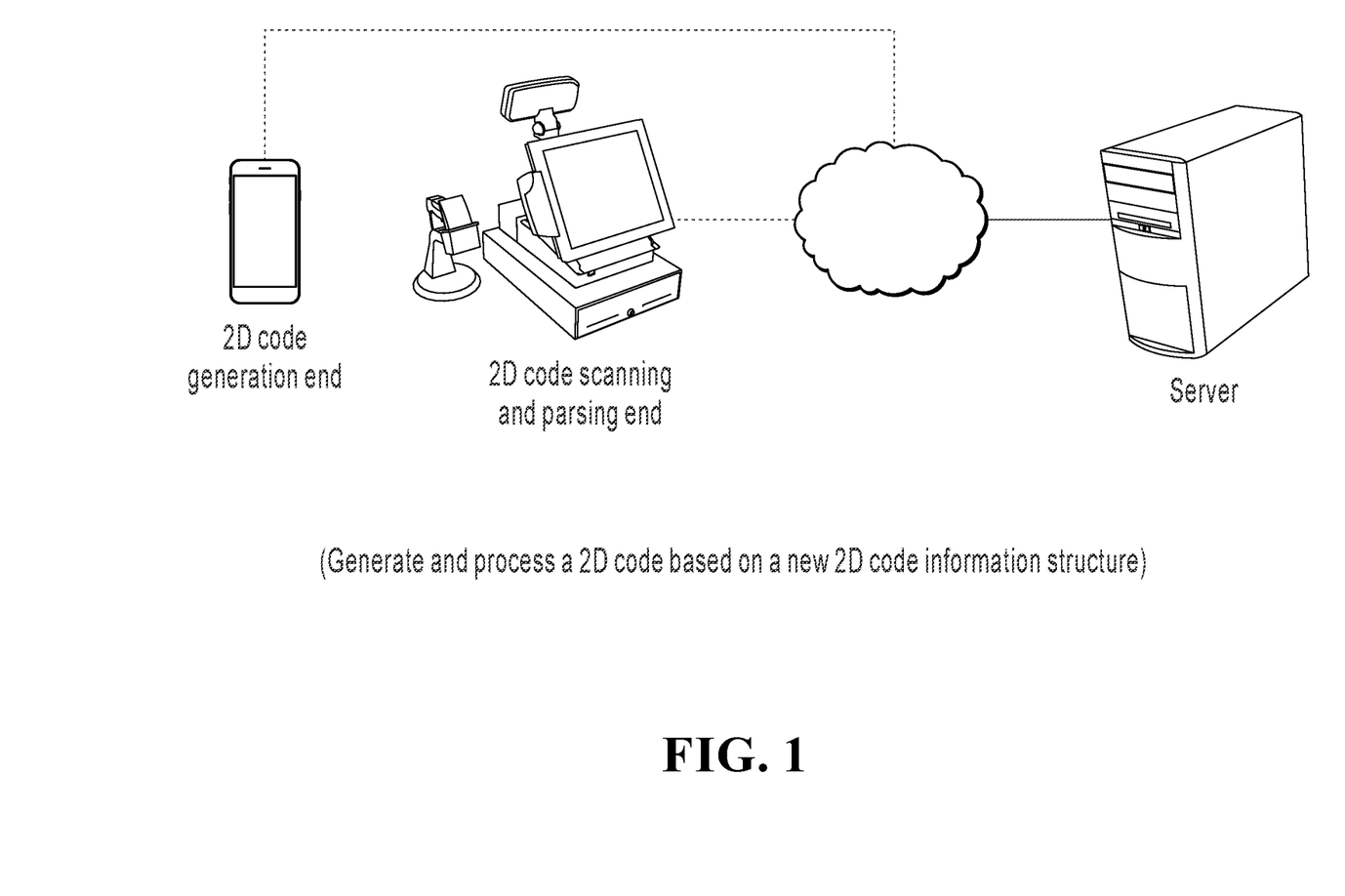
FIG. 1 is a schematic diagram illustrating an overall structure of a solution involved in an actual application scenario, according to the present specification.

FIG. 1 is a schematic diagram illustrating an overall structure of a solution involved in an actual application scenario, according to the present specification. The overall structure mainly involves three parts: a 2D code generation end, a 2D code scanning and parsing end, and a server. The 2D code generation end generates a 2D code based on a 2D code information structure, and presents the 2D code. The 2D code scanning and parsing end scans the 2D code, parses the 2D code based on the 2D code information structure, and executes a corresponding service based on a parsed result. The server usually participates in the process, so that the service execution can be successfully performed.

For example, the 2D code generation end includes a user terminal device such as a mobile phone or a smartwatch; the 2D code scanning and parsing end includes a merchant terminal device such as a point of sale (POS) machine, a cash register, or a scanner at an entrance of a bus; the server includes an e-commerce server, a server of a payment platform, a server of a public transportation platform, etc. Certainly, the merchant terminal device can first generate a 2D code, and the user terminal device can scan and parse the 2D code. For ease of description, this mode is referred to as a user scanning mode, and the previous mode is referred to as a mode that a user code is being scanned.

The structure in FIG. 1 is an example and is not unique. For example, the structure may not include the server. After a 2D code is generated, related services are processed by the 2D code scanning and parsing end, etc.

The following describes the solutions of the present specification in detail.

Figure 2:
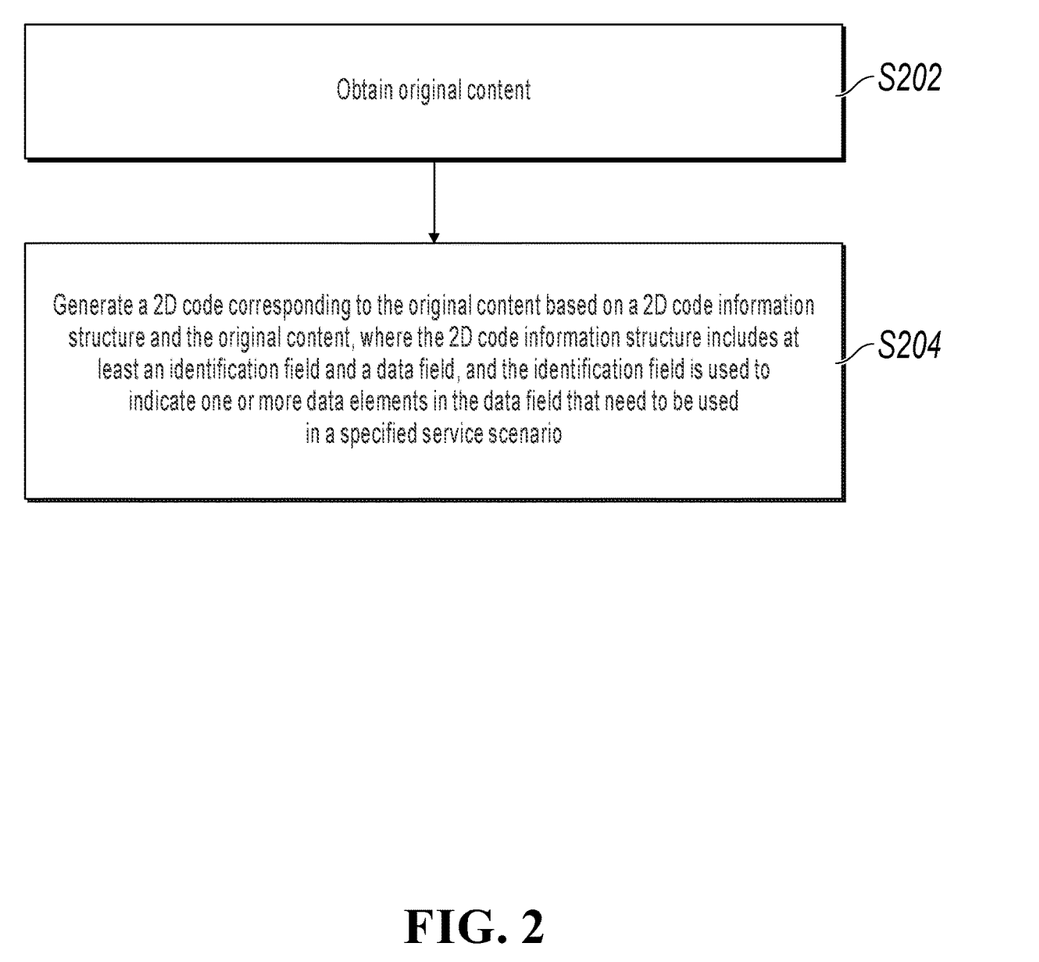
FIG. 2 is a schematic flowchart illustrating a 2D code generation method, according to an implementation of the present specification.

FIG. 2 is a schematic flowchart illustrating a 2D code generation method, according to an implementation of the present specification. The process in FIG. 2 includes the following steps.

S202. Obtain original content.

In the present implementation of the present specification, the original content includes data that needs to be used in a current service scenario when a corresponding service is executed, for example, a website, an account, an order number, a promotion code, or a business card.

S204. Generate a 2D code corresponding to the original content based on a 2D code information structure and the original content, where the 2D code information structure includes at least an identification field and a data field, and the identification field is used to indicate one or more data elements in the data field to be used in a specified service scenario.

In the present implementation of the present specification, in the generated 2D code, the corresponding data element includes the original content, and the corresponding data element can be extracted by scanning and parsing the 2D code and then used to execute the service.

In the present implementation of the present specification, specific content of the identification field and the data field can be flexibly and conveniently defined based on an actual requirement.

For any single scenario, when the scenario changes, specific content of the identification field and the data field can be adjusted, so that the 2D code can be effectively adapted to a scenario change.

The identification field can indicate a corresponding data element in the data field in a plurality of service scenarios, so that the generated 2D code can be applied to the plurality of service scenarios, namely, same code for multiple application scenarios. In the present implementation of the present specification, the identification field can indicate the data element in one or more methods. The following four methods are listed as examples.

Method 1: The identification field indicates existence of a data element in the data field. The data field usually includes a plurality of types of data elements. Different data elements may exist in different service scenarios. Data elements in the data field that needs to be used in the current service scenario can be configured based on the identification field.

Method 2: The identification field indicates a service definition of the data element. For example, in a transportation card service scenario, the identification field indicates a data element to represent promotion information (for example, a student discount, an accumulative quota discount), or the identification field indicates a data element to represent a type of transportation card (for example, a student card or a senior card, a bus card or a monthly train pass).

Method 3: The identification field indicates a location of a data element in the data field. For example, the data element is the 1st, 3rd, or 6th data element in the data field, to facilitate fast indexing of needed data elements.

Method 4: The identification field indicates a mapping relationship between a service scenario and a data element. Data elements in the data field that needs to be used can be determined based on the matching relationship and the current service scenario.

In the present implementation of the present specification, in addition to the identification field and the data field, more fields can be included, for example, the following one or more fields: a code header field, used to identify a developer of the 2D code information structure; a code version field, used to identify a version of the 2D code information structure; and a verification field, used to perform content verification on a field included in the 2D code information structure.

Based on the method in FIG. 2, the identification field and the data field can be flexibly and conveniently adjusted based on different service scenarios, to generate a 2D code applicable to one or more different service scenarios.

Based on the method in FIG. 2, the present implementation of the present specification further provides some specific implementation solutions of the method and an extended solution, which are described below.

In the present implementation of the present specification, the identification field is implemented in a plurality of methods, for example, implemented based on structures such as a bitmap, an array, or a linked list.

The following implementations are mainly described by using an example in which the identification field is implemented based on a bitmap. In this case, the identification field can include a bitmap field. The bitmap field is formed by one or more bits corresponding to the data element in the data field. The bit is used to indicate a data element corresponding to the bit.

For ease of understanding, the bitmap is explained here as an example. The bitmap is a data structure that represents a dense set in a finite field. In the bitmap, each element appears at least once, and no other data is associated with the element. The bitmap is widely applied in indexing, data compression, etc.

For example, the bitmap can be a bitmap in ISO 8583. In ISO 8583, the bitmap is a field or a subfield in a message, and indicates whether another data element or data element subfield exists elsewhere in the message. It is considered that the field exists only when a corresponding bit in the bitmap is determined. For example, assuming that a bitmap is a byte whose value is 0×82 (130 in the decimal system), and is represented as "10000010" in the binary system, it correspondingly indicates that fields 1 and 7 exist in a message, and fields 2, 3, 4, 5, 6, and 8 do not exist in the message.

For the bitmap field provided in the present specification, for example, when a value of a bit in the bitmap field is a first value, it indicates that a data element corresponding to the bit exists in the data field; or when a value of a bit in the bitmap field is a second value different from the first value, it indicates that a data element corresponding to the bit does not exist in the data field. If the first value is 1, the second value is 0; or if the first value is 0, the second value is 1.

More intuitively, the present implementation of the present specification further provides an example of a 2D code information structure. Description is provided with reference to Table 1 to Table 3. Table 1 shows an example of a 2D code information structure.

TABLE 1

| Code header field | Code version field | Bitmap field | Data field | Verification field |
| --- | --- | --- | --- | --- |

The bitmap field and the data field in Table 1 are further described by using an example.

Each bit in the bitmap field can correspond to a specific data element, and each bit in the bitmap field is set to 0 or 1 to determine a specific corresponding data element in the data field. For example, it is assumed that a length of the bitmap field is 4 bytes including 4*8=32 bits, as shown in Table 2.

TABLE 2

| Bits 1-8 | Bits 9-16 | Bits 17-24 | Bits 25-32 |
| --- | --- | --- | --- |
| 10100110 | 00000001 | 10000000 | 00000001 |

The bitmap field and the data field in Table 1 are further described by using an example.

Definitions in Table 1 and Table 2 indicate that the 1st, 3rd, 6th, 7th, 16th, 17th, and 32nd data elements exist in the data field, and other data elements do not exist.

The data field includes data elements. A data element corresponding to each bit in the bitmap field can have a specific service definition. Each data element has, for example, a data element value length-data element value structure, which is referred to as a length-value (LV) structure. The data field corresponding to Table 2 is shown in Table 3.

TABLE 3

| Data field | | | | | | |
|---|---|---|---|---|---|---|
| Data element 1 | Data element 3 | Data element 6 | Data element 7 | Data element 16 | Data element 17 | Data element 32 |
| L1V1 | L3V3 | L6V6 | L7V7 | L16V16 | L17V17 | L32V32 |

To minimize data redundancy, only a value of a data element can be reserved in the data field if a length of the data element is known. In addition, a self-defined field can be reserved for the data element. The self-defined field can further include an embedded sub-data element for service expansion.

Certainly, definitions in Table 1 to Table 3 are examples, and are not the only implementation method of the present specification.

Figure 3:
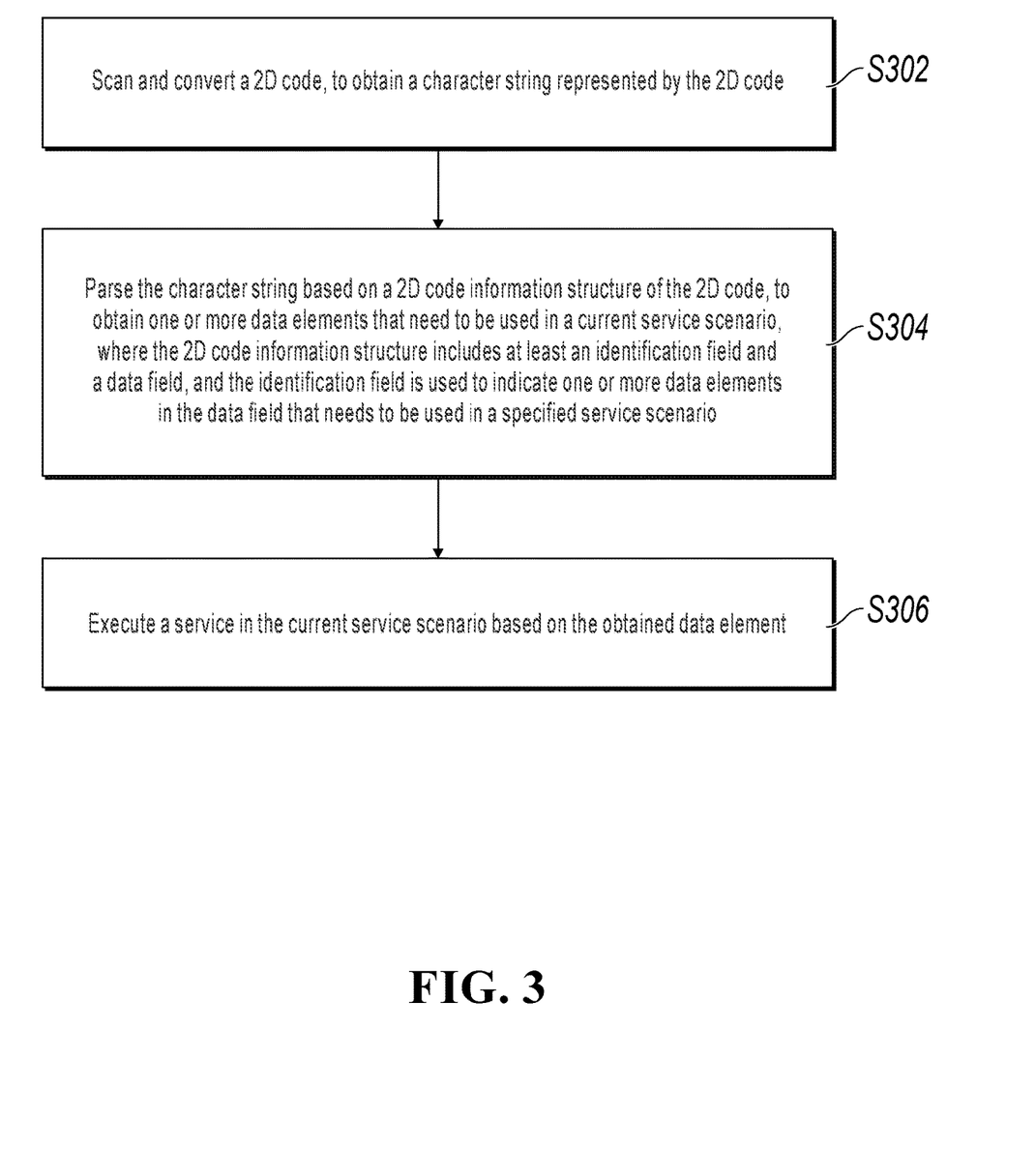
FIG. 3 is a schematic flowchart illustrating a 2D code processing method, according to an implementation of the present specification.

The above description is provided from the perspective of a 2D code generation end. Based on the same idea, an implementation of the present specification further provides a 2D code processing method. Description is provided from the perspective of a 2D code scanning and parsing end. FIG. 3 is a schematic flowchart of the 2D code processing method. The process in FIG. 3 includes the following steps.

S302. Scan and convert a 2D code, to obtain a character string represented by the 2D code.

In the present implementation of the present specification, the character string is generated based on a 2D code information structure and original content, and the character string is coded based on a coding rule specified by a 2D code to obtain the 2D code. Step S302 is a decoding process corresponding to the coding process.

S304. Parse the character string based on a 2D code information structure of the 2D code, to obtain one or more data elements that need to be used in a current service scenario, where the 2D code information structure includes at least an identification field and a data field, and the identification field is used to indicate one or more data elements in the data field that needs to be used in a specified service scenario.

S306. Execute a service in the current service scenario based on the obtained data element.

It can be seen from the descriptions of the previous implementations that the 2D code information structure facilitates effective execution of a service related to a 2D code.

From the perspective of an information coding bearer, the 2D code information structure is highly flexible and extensible, and can support service upgrade or industrial expansion. In a same code for multiple application scenarios situation, if service upgrade needs to be performed, for example, if new promotion information or a new type of transportation card needs to be added to a transportation application, a corresponding data element or even only a value definition needs to be added without changing a data structure too much.

From the perspective of a terminal device that performs scanning, the terminal device that performs scanning has unified data parsing logic regardless of a service supported in the expansion. As such, upgrade for modifying a terminal device program due to service upgrade is avoided, thereby reducing costs of terminal device reconstruction.

Figure 4:
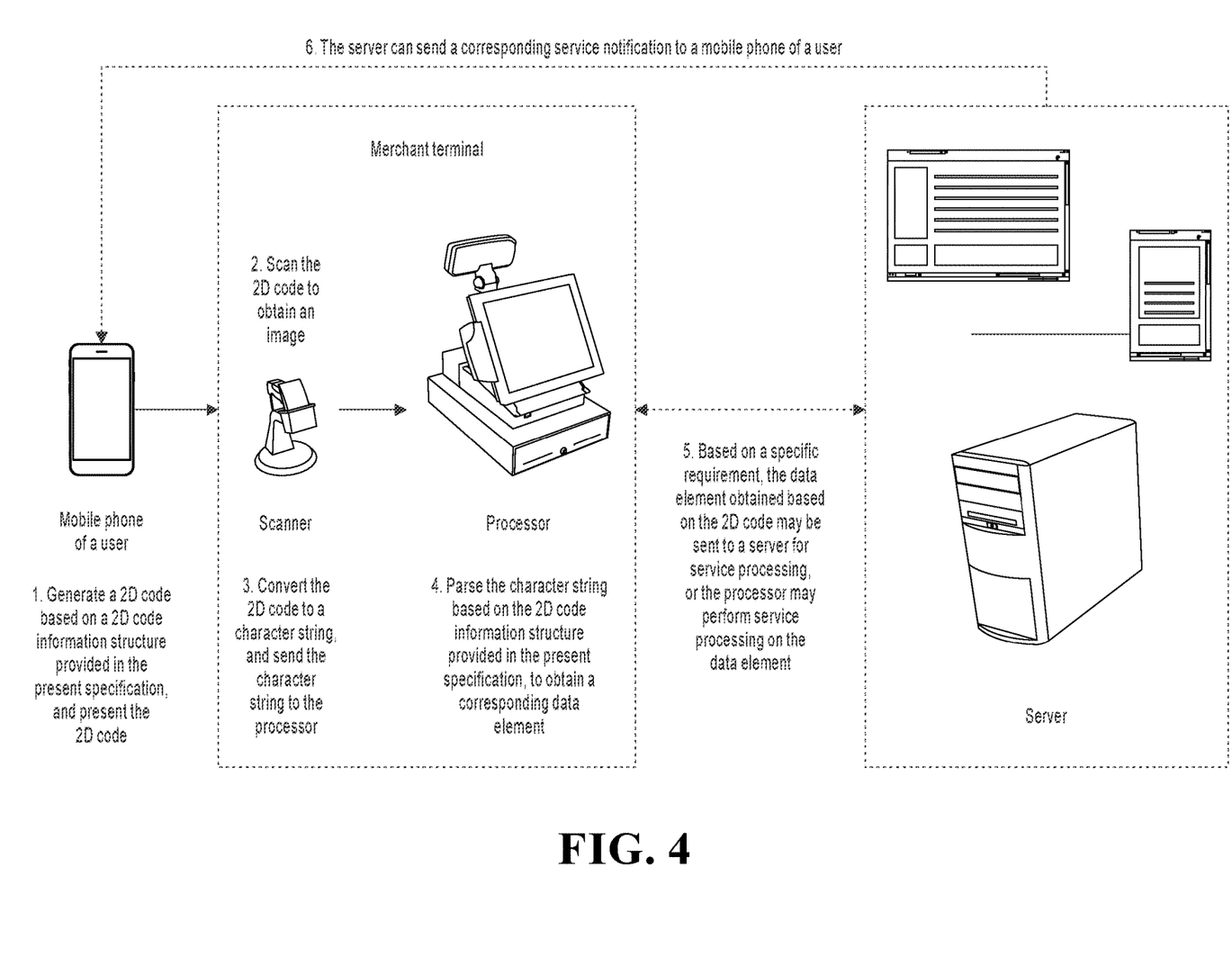
FIG. 4 is a schematic service flowchart illustrating a mode that a user code is being scanned in an actual application scenario of a 2D code, according to an implementation of the present specification.
Figure 5:
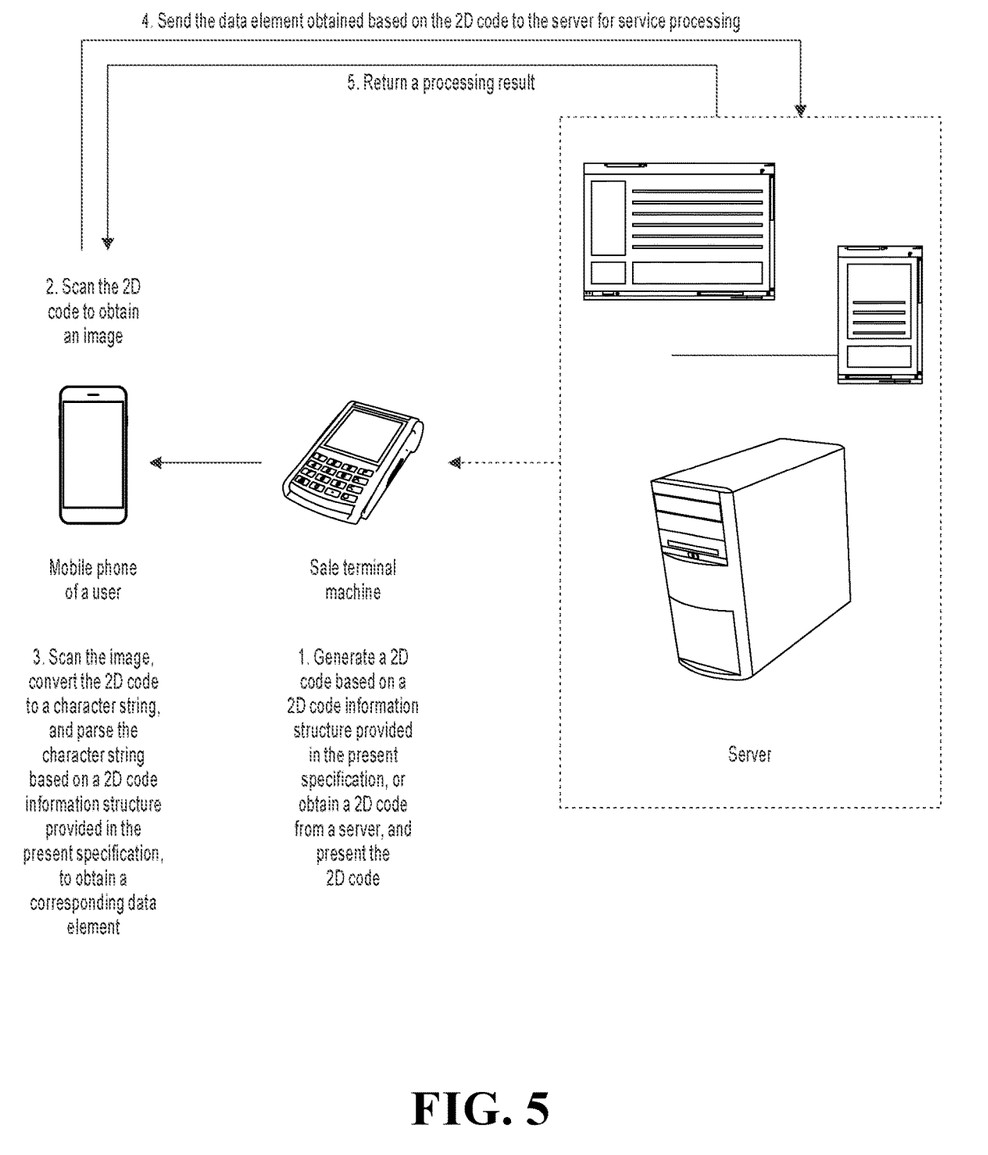
FIG. 5 is a schematic service flowchart illustrating a user scanning mode in an actual application scenario of a 2D code, according to an implementation of the present specification.

In the present implementation of the present specification, as mentioned above, both the 2D code generation and the 2D code processing can involve operations of a server. For ease of understanding, an implementation of the present specification further provides a service process of a mode that a user code is being scanned and a service process of a user scanning mode in an actual application scenario of a 2D code. FIG. 4 and FIG. 5 are schematic service flowcharts of the two modes.

The service process in FIG. 4 mainly includes the following steps:

A user's mobile phone generates a 2D code based on a 2D code information structure provided in the present specification, and presents the 2D code.

A scanner of a merchant terminal device scans the 2D code to obtain an image, converts the image to a character string through recognition, and sends the character string to a processor of the merchant terminal device.

The processor parses the character string based on the 2D code information structure, to obtain a corresponding data element.

Based on a specific requirement, the data element obtained by the processor based on the 2D code can be sent to the server for service processing, or the processor performs service processing on the data element. For the former case, the server may send a corresponding service notification to the mobile phone of the user after the processing.

The service process in FIG. 5 mainly includes the following steps:

A POS machine generates a 2D code based on a 2D code information structure provided in the present specification, or obtains a 2D code from a server; and presents the 2D code.

A user's mobile phone scans the 2D code to obtain an image, converts the image to a character string through recognition, and parses the character string based on the 2D code information structure, to obtain a corresponding data element.

The user's mobile phone sends the data element obtained based on the 2D code to the server for service processing.

The server returns a processing result to the user's mobile phone after the processing.

Figure 6:
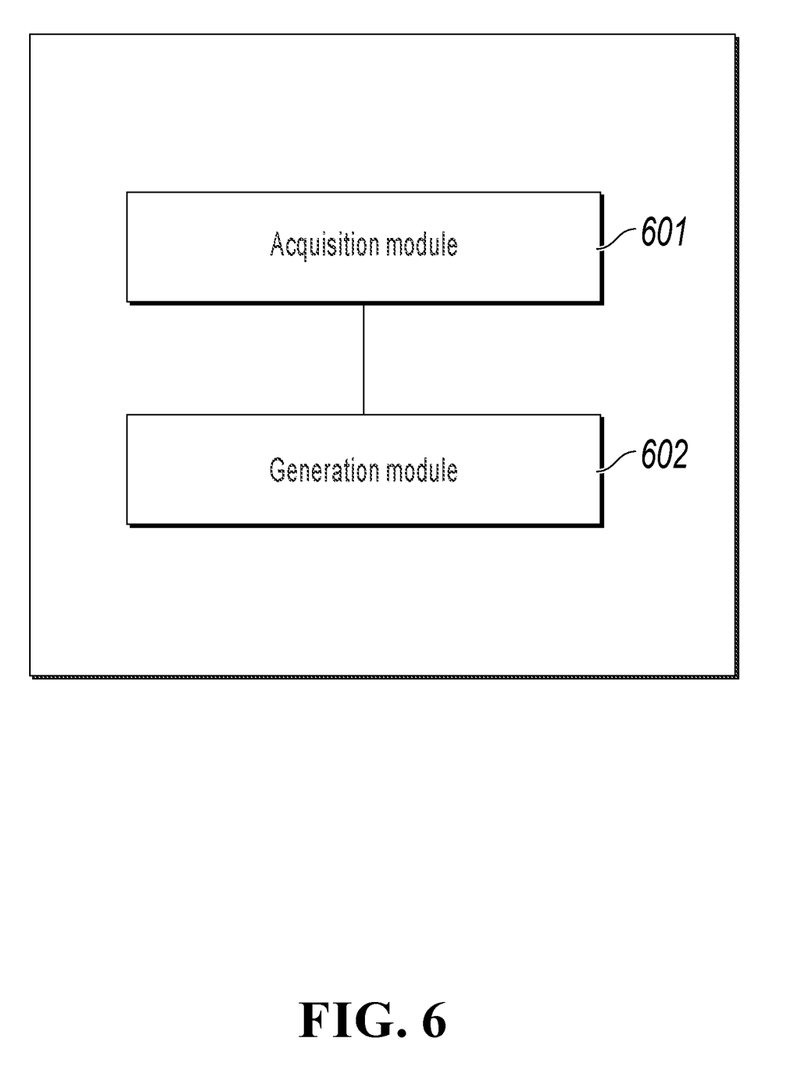
FIG. 6 is a schematic structural diagram illustrating a 2D code generation apparatus corresponding to FIG. 2, according to an implementation of the present specification.
Figure 7:
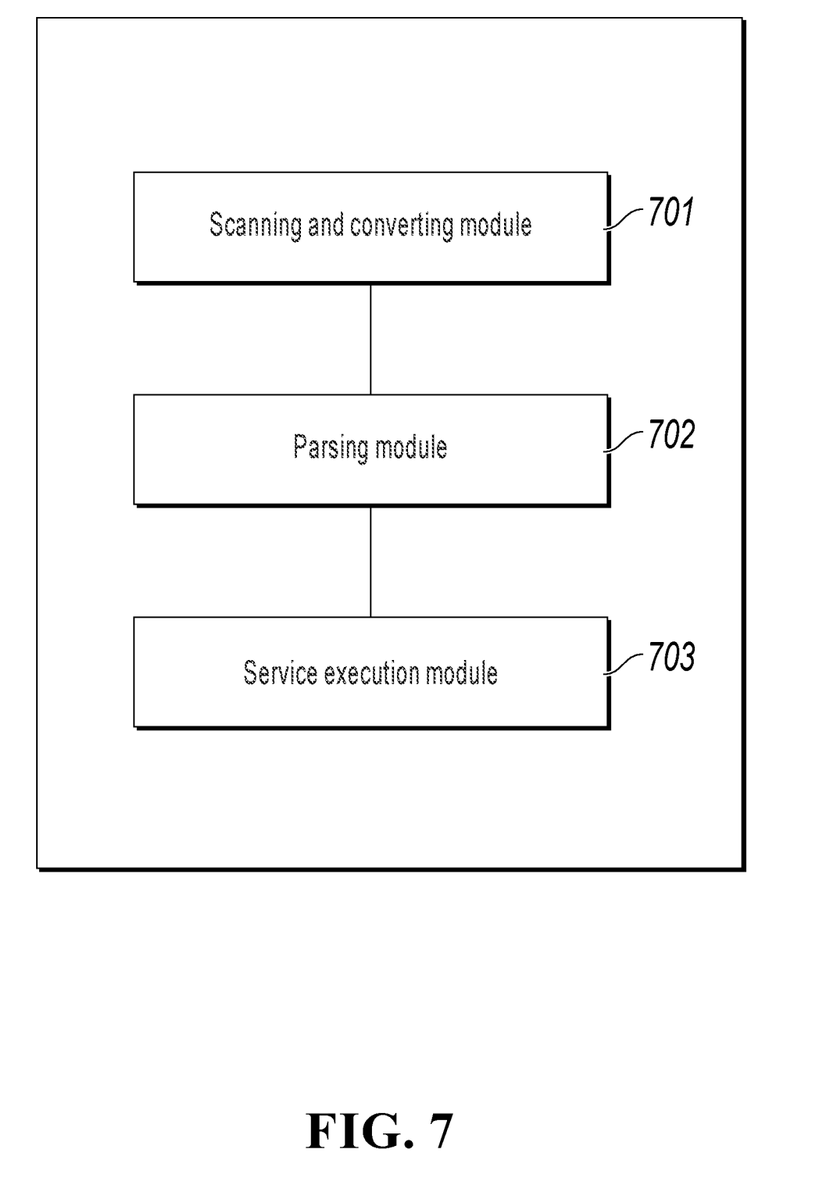
FIG. 7 is a schematic structural diagram illustrating a 2D code processing apparatus corresponding to FIG. 3, according to an implementation of the present specification.

As shown in FIG. 6 and FIG. 7, based on the same idea, an implementation of the present specification further provides an apparatus corresponding to the previous method.

FIG. 6 is a schematic structural diagram illustrating a 2D code generation apparatus corresponding to FIG. 2, according to an implementation of the present specification. The apparatus includes the following: an acquisition module 601, configured to obtain original content; and a generation module 602, configured to generate a 2D code corresponding to the original content based on a 2D code information structure and the original content.

The 2D code information structure includes at least an identification field and a data field. The identification field is used to indicate one or more data elements in the data field that need to be used in a specified service scenario.

Optionally, the identification includes at least one of the following: indicating existence of a data element in the data field; indicating a service definition of the data element; indicating a location of the data element in the data field; and indicating a matching relationship between a service scenario and a data element.

Optionally, the identification field includes a bitmap field. The bitmap field consists of one or more bits corresponding to the data element in the data field.

The bit is used to indicate a data element corresponding to the bit.

Optionally, when a value of a bit in the bitmap field is a first value, it indicates that a data element corresponding to the bit exists in the data field; or when a value of a bit in the bitmap field is a second value different from the first value, it indicates that a data element corresponding to the bit does not exist in the data field.

Optionally, the identification field further includes a field used to define the bitmap field.

Optionally, the 2D code information structure further includes at least one of the following fields: a code header field, used to identify a creator of the 2D code information structure; a code version field, used to identify a version of the 2D code information structure; and a verification field, used to perform content verification on a field included in the 2D code information structure.

Optionally, content of a data element includes a value of the data element and a length of the value of the data element.

FIG. 7 is a schematic structural diagram illustrating a 2D code processing apparatus corresponding to FIG. 3 according to an implementation of the present specification. The apparatus includes the following: a scanning and converting module 701, configured to scan and convert a 2D code, to obtain a character string represented by the 2D code; a parsing module 702, configured to parse the character string based on a 2D code information structure of the 2D code, to obtain one or more data elements that need to be used in a current service scenario; and a service execution module 703, configured to execute a service in the current service scenario based on the obtained data element.

The 2D code information structure includes at least an identification field and a data field. The identification field is used to indicate one or more data elements in the data field that need to be used in a specified service scenario.

Based on the same idea, an implementation of the present specification further provides a 2D code generation device corresponding to FIG. 2, including at least one processor; and a memory communicatively connected to the at least one processor.

The memory stores an instruction that can be executed by the at least one processor. The instruction is executed by the at least one processor to enable the at least one processor to obtain original content; and generate a 2D code corresponding to the original content based on a 2D code information structure and the original content.

The 2D code information structure includes at least an identification field and a data field. The identification field is used to indicate one or more data elements in the data field that need to be used in a specified service scenario.

Based on the same idea, an implementation of the present specification further provides a 2D code processing device corresponding to FIG. 3, including at least one processor; and a memory communicatively connected to the at least one processor.

The memory stores an instruction that can be executed by the at least one processor. The instruction is executed by the at least one processor to enable the at least one processor to scan and convert a 2D code, to obtain a character string represented by the 2D code; parse the character string based on a 2D code information structure of the 2D code, to obtain one or more data elements that need to be used in a current service scenario; and execute a service in the current service scenario based on the obtained data element.

The 2D code information structure includes at least an identification field and a data field. The identification field is used to indicate one or more data elements in the data field that need to be used in a specified service scenario.

Based on the same idea, an implementation of the present application further provides a non-volatile computer storage medium corresponding to FIG. 2. The non-volatile computer storage medium stores a computer executable instruction. The computer executable instruction is used to obtain original content; and generate a 2D code corresponding to the original content based on a 2D code information structure and the original content.

The 2D code information structure includes at least an identification field and a data field. The identification field is used to indicate one or more data elements in the data field that need to be used in a specified service scenario.

Based on the same idea, an implementation of the present application further provides a non-volatile computer storage medium corresponding to FIG. 3. The non-volatile computer storage medium stores a computer executable instruction. The computer executable instruction is used to scan and convert a 2D code, to obtain a character string represented by the 2D code; parse the character string based on a 2D code information structure of the 2D code, to obtain one or more data elements that need to be used in a current service scenario; and execute a service in the current service scenario based on the obtained data element.

The 2D code information structure includes at least an identification field and a data field. The identification field is used to indicate one or more data elements in the data field that need to be used in a specified service scenario.

Specified implementations of the present specification are described above. Other implementations fall within the scope of the appended claims. In some cases, the actions or steps described in the claims can be performed in an order different from the order in the implementations, and desired results can still be achieved. In addition, the process depicted in the accompanying drawings does not necessarily require a particular execution order to achieve the desired results. In some implementations, multitasking and parallel processing can be performed or can be advantageous.

The implementations in the present specification are described in a progressive way. For same or similar parts in the implementations, reference can be made to the implementations. Each implementation focuses on a difference from other implementations. Especially, an apparatus implementation, a device implementation, and a non-volatile computer storage medium implementation are basically similar to a method implementation, and therefore are described briefly. For related parts, reference can be made to corresponding descriptions in the method implementation.

The apparatus, the device, and the non-volatile computer storage medium provided in the implementations of the present specification are consistent to the method implementations described above. Therefore, the apparatus, the device, and the non-volatile computer storage medium also have beneficial technical effects similar to a beneficial technical effect of the corresponding method. The beneficial technical effect of the method is described in detail above. Therefore, the beneficial technical effects of the corresponding apparatus, device, and non-volatile computer storage medium are not described here again.

In the 1990s, whether technology improvement is hardware improvement (for example, improvement of a circuit structure such as a diode, a transistor, or a switch) or software improvement (improvement of a method process) can be obviously distinguished. However, as technologies develop, improvements in many current method processes can be considered as a direct improvement in a hardware circuit structure. Almost all designers obtain corresponding hardware circuit structures by programming improved method processes to hardware circuits. Therefore, a method process can be improved by using a hardware entity module. For example, a programmable logic device (PLD) (such as a field programmable gate array (FPGA)) is such an integrated circuit whose logic function is determined by programming a device by a user. The designer performs programming to "integrate" a digital system to a PLD without requesting a chip manufacturer to design and produce an application-specific integrated circuit chip. In addition, currently, instead of manually producing integrated circuit chips, the programming is mostly implemented by "logic compiler" software, which is similar to a software compiler used for program development and writing. Original code is also written by using a specific programming language, which is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The Very-High-Speed Integrated Circuit Hardware Description Language (VHDL) and Verilog are most commonly used currently. A person skilled in the art should also understand that a hardware circuit that implements a logical method process can be readily obtained once the method process is logically programmed by using the several described hardware description languages and is programmed into an integrated circuit.

A controller can be implemented in any appropriate way. For example, the controller can take the form of, for example, a microprocessor or a processor and a computer readable medium storing computer readable program code (such as software or firmware) that can be executed by the microprocessor or the processor, a logic gate, a switch, an application specific integrated circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. A memory controller can also be implemented as a part of control logic of a memory. A person skilled in the art also knows that, in addition to implementing the controller by using the computer readable program code, logic programming can be performed through method steps to allow the controller to implement the same function in forms of the logic gate, the switch, the programmable logic controller, the programmable logic controller, and the embedded microcontroller. Therefore, the controller can be considered as a hardware component, and an apparatus configured to implement various functions in the controller can also be considered as a structure in a hardware component. Or, the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product with a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the previously described apparatus is described by dividing functions into various units. Certainly, when the present specification is implemented, the functions of each unit can be implemented in one or more pieces of software and/or hardware.

A person skilled in the art should understand that the implementations of the present specification can be provided as a method, a system, or a computer program product. Therefore, the implementations of the present specification can use a form of hardware only implementations, software only implementations, or implementations with a combination of software and hardware. In addition, the implementations of the present specification can use a form of a computer program product implemented on one or more computer-usable storage media (including but not limited to a magnetic disk storage, a CD-ROM, an optical memory, etc.) that includes computer-usable program code.

The present specification is described with reference to the flowcharts and/or block diagrams of the method, the device (system), and the computer program product according to the implementations of the present specification. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions can be stored in a computer readable memory that can instruct the computer or the another programmable data processing device to work in a specific method, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In typical configuration, a computing device includes one or more processors (CPU), an input/output interface, a network interface, and a memory.

The memory can include a non-persistent memory, a random access memory (RAM), a nonvolatile memory, and/or another form that are in a computer readable medium, for example, a read-only memory (ROM) or a flash memory. The memory is an example of the computer readable medium.

The computer readable medium includes persistent, non-persistent, movable, and unmovable media that can implement information storage by using any method or technology. Information can be a computer readable instruction, a data structure, a program module, or other data. An example of a computer storage medium includes but is not limited to a phase-change random access memory (PRAM), a static random access memory (SRAM), a dynamic random access memory (DRAM), another type of random access memory (RAM), a read-only memory (ROM), an electrically erasable programmable read only memory (EEPROM), a flash memory or another memory technology, a compact disc read-only memory (CD-ROM), a digital versatile disc (DVD) or other optical storage, a cassette magnetic tape, tape and disk storage or another magnetic storage device or any other non-transmission media that can be configured to store information that can be accessed by the computing device. Based on the definition in the present specification, the computer readable medium does not include a transitory computer-readable media (transitory media), for example, a modulated data signal and carrier.

It is worthwhile to further note that the terms "include", "comprise", or their any other variant is intended to cover a non-exclusive inclusion, so that a process, a method, an article, or a device that includes a list of elements not only includes those elements but also includes other elements which are not expressly listed, or further includes elements inherent to such process, method, article, or device. An element preceded by "includes a . . . " does not, without more constraints, preclude the existence of additional identical elements in the process, method, article, or device that includes the element.

The present specification can be described in the general context of computer-executable instructions, for example, a program module. Generally, the program module includes a routine, a program, an object, a component, a data structure, etc., for executing a particular task or implementing a particular abstract data type. The present specification can alternatively be practiced in distributed computing environments in which tasks are performed by remote processing devices that are connected through a communications network. In a distributed computing environment, the program module can be located in both local and remote computer storage media that includes storage devices.

The implementations in the present specification are described in a progressive way. For same or similar parts in the implementations, reference can be made to the implementations. Each implementation focuses on a difference from other implementations. Particularly, a system implementation is similar to a method implementation, and therefore, is described briefly. For related parts, reference can be made to partial descriptions in the method implementation.

The previous descriptions are merely implementations of the present specification, and are not intended to limit the present specification. For a person skilled in the art, the present application can have various modifications and changes. Any modifications, equivalent substitutions, improvements, etc. made in the spirit and principle of the present specification shall fall in the scope of the claims in the present specification.

Figure 8:
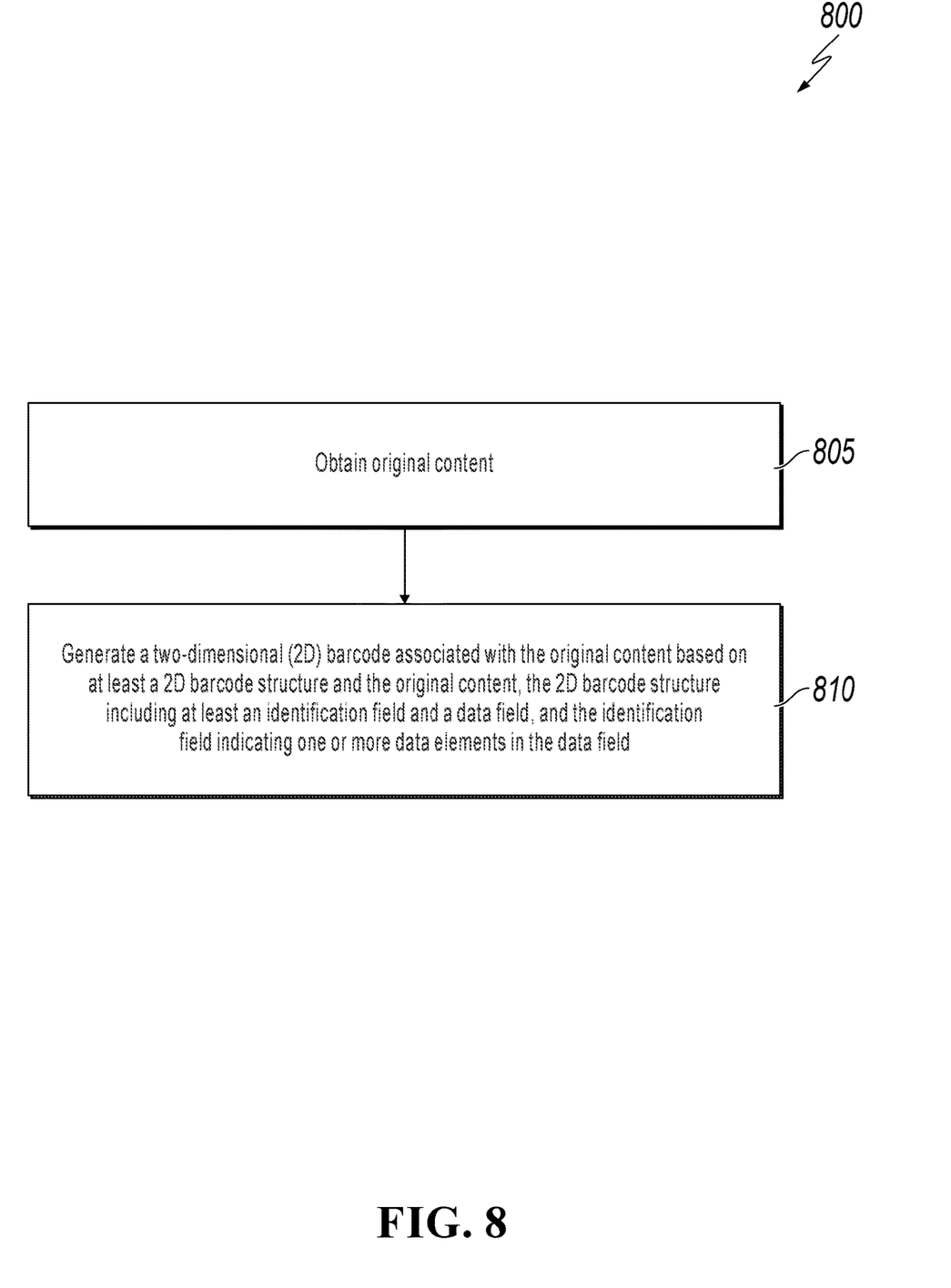
FIG. 8 is a flowchart illustrating an example of a computer-implemented method for generating a 2D barcode, according to an implementation of the present disclosure.

FIG. 8 is a flowchart illustrating an example of a computer-implemented method 800 for generating a 2D barcode, according to an implementation of the present disclosure. For clarity of presentation, the description that follows generally describes method 800 in the context of the other figures in this description. However, it will be understood that method 800 can be performed, for example, by any system, environment, software, and hardware, or a combination of systems, environments, software, and hardware, as appropriate. In some implementations, various steps of method 800 can be run in parallel, in combination, in loops, or in any order.

At 805, original content is obtained or identified. In some cases, the original content is content to be encoded in a two-dimensional (2D) barcode structure. In some implementations, the original content can include data (such as, a website, an account, an order number, a promotion code, and a business card) that is needed in a current service scenario to execute a corresponding service. The original content can be obtained by a barcode generation device (such as, a user terminal device, and a merchant terminal device) to generate a corresponding 2D barcode. In some cases, the 2D barcode is a Quick Response (QR) code. The user terminal device can be, for example, a mobile phone or a smartwatch. The merchant terminal device can be, for example, a point of sale (POS) device, a cash register, and a bus entrance scanner. In some implementations, to execute a particular service, a user terminal device can generate and display a corresponding 2D barcode, and a merchant terminal device can scan and parse the corresponding 2D barcode to execute the particular service. In some cases, the merchant terminal device can generate and display the corresponding 2D barcode, and the user terminal device can scan and parse the corresponding 2D barcode to execute the particular service. In some implementations, a server can participate in the service execution process. The server can be, for example, an e-commerce server, a server of a payment platform, and a server of a public transportation platform. From 805, method 800 proceeds to 810.

At 810, a two-dimensional (2D) barcode associated with the original content is generated based on at least a 2D barcode structure and the original content. The generated 2D barcode can be a Quick Response (QR) code, a Grid Matrix (GM) code, and a Compact Matrix (CM) code. In some implementations, the 2D barcode structure can include at least an identification field and a data field. The identification field can be used to indicate one or more data elements in the data field. For example, in the generated 2D barcode, the original content can be included in one or more data elements in a data field of the generated 2D barcode. In addition, an identification field of the generated 2D barcode can be used to indicate the one or more data elements in the data field of the generated 2D barcode in different service scenarios. As a result, the same 2D barcode can be used in the different service scenarios. In other words, contents of the identification field, the data field, or both the identification field and the data field can be defined on demand, so that the generated 2D barcode can be applicable to a changing service scenario as well as different service scenarios.

In some implementations, each particular data element of the one or more data elements in the data field can include a value and a length of the particular data element (such as a Length-Value (LV) structure). In some cases, if the length of the particular data element is known, only the value of the particular data element is included in the data field to reduce data redundancy. In addition, a self-defined field can be reserved for the particular data element. The self-defined field can include one or more embedded sub-data elements for service expansion.

In some implementations, the identification field can be used to indicate existence of the one or more data elements in the data field. Different data elements can exist in different service scenarios. For example, the identification field can include a bitmap field. The bitmap field can include one or more bits corresponding to the one or more data elements in the data field. Each bit of the one or more bits in the bitmap field can be used to indicate the existence of a corresponding data element of the one or more data elements in the data field. A particular bit having a first value (such as 1) can be used to indicate that a corresponding data element exists in the data field. The particular bit having a second value (such as 0), different from the first value, can be used to indicate that the corresponding data element does not exist in the data field. In some cases, the identification field can include a definition field to define the bitmap field.

In some implementations, the identification field can be used to indicate corresponding service definitions of the one or more data elements in the data field. For example, in a transportation card service scenario, the identification field can be used to indicate a particular data element to represent promotion information (such as, a student discount, and an accumulative quota discount), and to indicate another particular data element to represent transportation card type (such as, a student card, a senior card, a bus card, and a monthly train pass).

In some implementations, the identification field can be used to indicate corresponding locations of the one or more data elements in the data field. For example, the identification field can be used to indicate that data elements needed are the $1^{st}$, $3^{rd}$ and $6^{th}$ data elements in the data field for fast indexing.

In some implementations, the identification field can be used to indicate a matching relationship between one or more service scenarios and the one or more data elements in the data field. Data elements in the data field needed in a current service scenario can be determined based on the matching relationship. For example, data elements matching a transportation card service scenario can be determined to be used in the transportation card service scenario. Data elements matching a payment service scenario can be determined to be used in the payment service scenario.

In some implementations, the 2D barcode structure can include at least one of a header field, a version filed, and a verification field. The header field can be used to indicate a developer of the 2D barcode structure. The version filed can be used to indicate a version of the 2D barcode structure. The verification field can be used to perform content verification on, for example, one or more fields in the 2D barcode structure.

In some implementations, after the 2D barcode is generated, the generated 2D barcode can be displayed by, for example, a merchant terminal device. A user terminal device, for example, can scan the displayed 2D barcode to obtain a character string represented by the 2D barcode. The character string can be parsed, based on the 2D barcode structure, to obtain one or more data elements that match a current service scenario. A service in the current service scenario can be executed based on the obtained one or more data elements. In some implementations, the service can be executed by a server connected with the user terminal device. Once the server has completed the service, the server can notify the user terminal device. In some cases, the service can be executed locally, for example, by the user terminal device. After 810, method 800 stops.

Two-dimensional (2D) barcodes can be used in different business application scenarios to carry information about products and services. Normally, each service supported by an application has a distinct 2D barcode information structure. For example, in a particular 2D barcode information structure, each data bit is predefined and contains only value information of the data. As a result, different shortcuts are provided for a user to select, so that a 2D barcode corresponding to a selected service can be displayed and scanned accordingly. The subject matter described in this specification can be used to generate and process a 2D barcode applicable to various business scenarios, not just a single business scenario. For example, a unique 2D barcode information structure can include an identification field and a data field. The identification field can be used to indicate one or more data elements in the data field. Based on different business scenarios, adjustments can be made to the identification field and the data field, to generate a 2D barcode applicable to one or more business scenarios. Corresponding business services can be performed based on the 2D barcode. As a result, the unique 2D barcode information structure is flexible and scalable, thereby improving user experience when using 2D barcodes.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
    identifying original content to be encoded in a two-dimensional (2D) barcode structure, wherein the 2D barcode structure includes at least an identification field and a data field, the identification field indicating a presence or absence of one or more data elements in the data field, and the identification field including one or more bits as a bitmap field, wherein a particular bit of the one or more bits in the bitmap field having a first value indicates a presence of a corresponding data element of the one or more data elements in the data field, and the particular bit having a second value, different from the first value, indicates an absence of the corresponding data element in the data field;
    generating a 2D barcode associated with the original content based on at least the 2D barcode structure and the original content;
    scanning the generated 2D barcode;
    obtaining a character string represented by the scanned 2D barcode;
    parsing the character string based on the 2D barcode structure to obtain one or more data elements that match a current service scenario; and
    executing a service in the current service scenario based on the obtained one or more data elements.

2. The computer-implemented method of claim 1, wherein the identification field indicating one or more data elements in the data field includes at least one of:
    the identification field indicating existence of the one or more data elements in the data field;
    the identification field indicating corresponding service definitions of the one or more data elements in the data field;
    the identification field indicating corresponding locations of the one or more data elements in the data field; and
    the identification field indicating a matching relationship between one or more service scenarios and the one or more data elements in the data field.

3. The computer-implemented method of claim 1, wherein the first value is 1, and the second value is 0.

4. The computer-implemented method of claim 1, wherein the identification field includes a definition field to define the bitmap field, and the 2D barcode structure further includes at least one of a header field indicating a developer of the 2D barcode structure, a version filed indicating a version of the 2D barcode structure, and a verification field used to perform content verification.

5. The computer-implemented method of claim 1, wherein each particular data element of the one or more data elements in the data field includes a value and a length of the particular data element.

6. The computer-implemented method of claim 1, wherein the 2D barcode is a Quick Response (QR) code.

7. A non-transitory, computer-readable medium storing one or more instructions executable by a computer system to perform operations comprising:
   identifying original content to be encoded in a two-dimensional (2D) barcode structure, wherein the 2D barcode structure includes at least an identification field and a data field, the identification field indicating a presence or absence of one or more data elements in the data field, and the identification field including one or more bits as a bitmap field, wherein a particular bit of the one or more bits in the bitmap field having a first value indicates a presence of a corresponding data element of the one or more data elements in the data field, and the particular bit having a second value, different from the first value, indicates an absence of the corresponding data element in the data field;
   generating a 2D barcode associated with the original content based on at least the 2D barcode structure and the original content;
   scanning the generated 2D barcode;
   obtaining a character string represented by the scanned 2D barcode;
   parsing the character string based on the 2D barcode structure to obtain one or more data elements that match a current service scenario; and
   executing a service in the current service scenario based on the obtained one or more data elements.

8. The non-transitory, computer-readable medium of claim 7, wherein the identification field indicating one or more data elements in the data field includes at least one of:
   the identification field indicating existence of the one or more data elements in the data field;
   the identification field indicating corresponding service definitions of the one or more data elements in the data field;
   the identification field indicating corresponding locations of the one or more data elements in the data field; and
   the identification field indicating a matching relationship between one or more service scenarios and the one or more data elements in the data field.

9. The non-transitory, computer-readable medium of claim 7, wherein the first value is 1, and the second value is 0.

10. The non-transitory, computer-readable medium of claim 7, wherein the identification field includes a definition field to define the bitmap field, and the 2D barcode structure further includes at least one of a header field indicating a developer of the 2D barcode structure, a version filed indicating a version of the 2D barcode structure, and a verification field used to perform content verification.

11. The non-transitory, computer-readable medium of claim 7, wherein each particular data element of the one or more data elements in the data field includes a value and a length of the particular data element.

12. The non-transitory, computer-readable medium of claim 7, wherein the 2D barcode is a Quick Response (QR) code.

13. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
      identifying original content to be encoded in a two-dimensional (2D) barcode structure, wherein the 2D barcode structure includes at least an identification field and a data field, the identification field indicating a presence or absence of one or more data elements in the data field, and the identification field including one or more bits as a bitmap field, wherein a particular bit of the one or more bits in the bitmap field having a first value indicates a presence of a corresponding data element of the one or more data elements in the data field, and the particular bit having a second value, different from the first value, indicates an absence of the corresponding data element in the data field;
      generating a 2D barcode associated with the original content based on at least the 2D barcode structure and the original content;
      scanning the generated 2D barcode;
      obtaining a character string represented by the scanned 2D barcode;
      parsing the character string based on the 2D barcode structure to obtain one or more data elements that match a current service scenario; and
      executing a service in the current service scenario based on the obtained one or more data elements.

14. The system of claim 13, wherein the identification field indicating one or more data elements in the data field includes at least one of:
   the identification field indicating existence of the one or more data elements in the data field;
   the identification field indicating corresponding service definitions of the one or more data elements in the data field;
   the identification field indicating corresponding locations of the one or more data elements in the data field; and
   the identification field indicating a matching relationship between one or more service scenarios and the one or more data elements in the data field.

15. The system of claim 13, wherein the first value is 1, and the second value is 0.

* * * * *